No. 741,397. PATENTED OCT. 13, 1903.
J. C. GARRATT & T. BROWN.
MEAT HANGER.
APPLICATION FILED JUNE 6, 1902.
NO MODEL.

Witnesses
F. Van Heusenbrinck
Jno. J. Allen

Inventors
John Choyce Garratt
Thomas Brown.
by Alexander & Co
Attorneys

THE NORRIS PETERS CO., PHOTO-LITHO., WASHINGTON, D. C.

No. 741,397. Patented October 13, 1903.

UNITED STATES PATENT OFFICE.

JOHN CHOYCE GARRATT, OF BIRMINGHAM, AND THOMAS BROWN, OF OLTON, ENGLAND.

MEAT-HANGER.

SPECIFICATION forming part of Letters Patent No. 741,397, dated October 13, 1903.

Application filed June 6, 1902. Serial No. 110,551. (No model.)

*To all whom it may concern:*

Be it known that we, JOHN CHOYCE GARRATT, residing at Birmingham, and THOMAS BROWN, residing at Rothersthorpe, St. Bernards Road, Olton, in the county of Warwick, England, subjects of the King of Great Britain, have invented a new and useful Hook or Suspender for Bacon or other Meat, (for which we have filed an application for patent in Great Britain, No. 1,194, bearing date of January 16, 1902,) of which the following is a specification.

Our invention consists in an improved hook or suspender for bacon and other meat the use of which prevents flitches or drafts suspended thereby from curling and assuming various distorted shapes which result from the usual practice of hanging the flitch or draft from one point of suspension by a single common meat-hook or piece of string or cord. This shrinkage and distortion of the flitch or draft consequent on its being suspended to dry after curing necessitates rolling or stretching or other manipulation to endeavor to straighten the flitch, which is not attended with success. Therefore the cruciform shape of the flitch incurs considerable waste in cutting up, whereas by the use of our invention the flitches or drafts are prevented from curling and dry in good shape and form for cutting up.

With a view to facilitate conception of our invention and enable the same to be readily constructed we have illustrated three forms of our hook or suspender on the sheet of drawings appended hereto.

Figure 3:
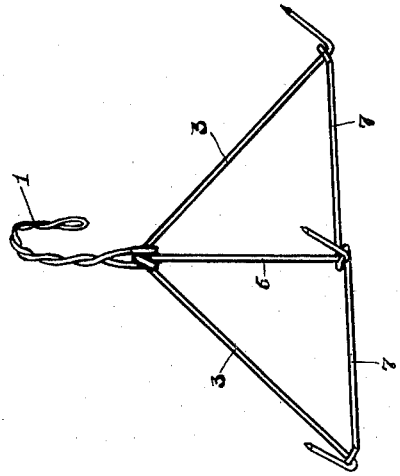
Figure 4:
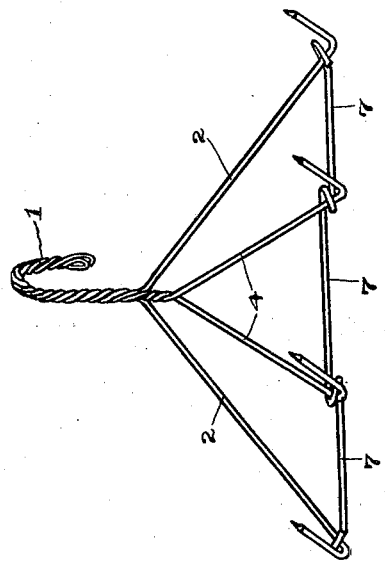
Figure 2:
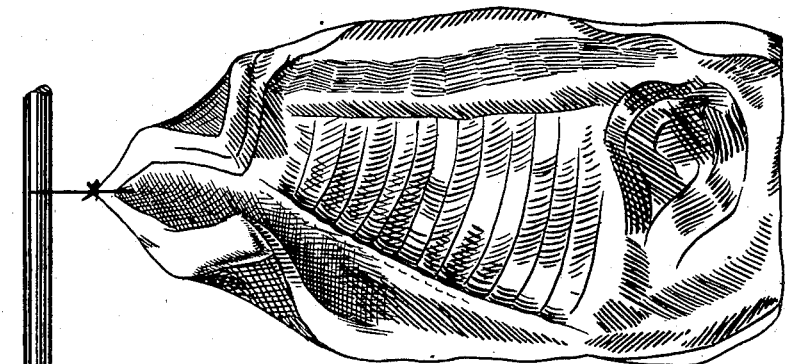
Figure 1:
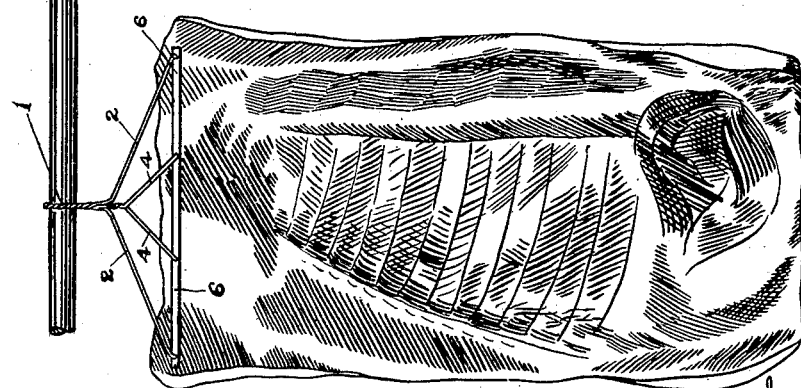

Figure 1 shows one form of our hook or suspender applied to a flitch of bacon, illustrating how the latter is kept from curling up or distorted shrinkage. Fig. 2 shows a flitch as usually suspended at one point by a piece of string or one single hook curled up and distorted in shape as the result. Fig. 3 shows another form of our hook or suspender in a perspective view to facilitate conception, the suspender having three hooks. Fig. 4 is another form of our suspender, (a similar view to Fig. 3,) the suspender having four hooks.

In carrying our invention into practice we twist from one or any number of pieces of wire of suitable thickness and of any metal a plain hook 1 or form the same solid by stamping or the like. The ends of the wires which issue from the shank of the hook are then extended out sidewise, as seen in the drawings at 2 and 4, Figs. 1 and 4, and 3 and 5, Fig. 3, in delta form, their extremities being turned upward and pointed or sharpened for use. There may be, as aforesaid, any number of wires produced from the hook-shank, four being shown in Figs. 1 and 4, while only three are shown in Fig. 3. Whether there are three or more wires, they are connected together near their turn-up parts (which form them into hooks for holding the flitch or draft) by a staying wire strip or band. In the hook as shown at Fig. 1 a flat strip 6 is used through holes in which the wires are threaded. This strip thus holds the wire in line and prevents the flitch held by such hook or suspender from curling up, as its side edges are held rigidly apart. The same remarks apply equally to the hooks as shown by Figs. 3 and 5, except that in these the strip is replaced by a wire 7, which is lapped around each hook and forms a strut between each wire of the delta-shaped hook for keeping the hooks in line and effectually preventing the bacon or meat from curling up or becoming distorted in shape while drying.

What we claim, then, is—

1. A meat-hanger comprising a suspension-hook formed of wires twisted together, the ends of said wires diverging downwardly and outwardly from the lower end of the hook-shank and formed at their lower ends into upwardly-extending hooks, and a horizontal stay-piece connecting and holding rigidly all of said wires at the said hooks in one vertical plane, whereby cured meat may be prevented from distortion while drying, substantially as described.

2. A meat-hanger comprising a suspension-hook 1 formed of two double wires twisted together, the ends 2, 2, of one twisted wire being extended downwardly and terminating in upturned hooks, and the ends 4, 4, of the other twisted wire being extended downwardly and outwardly between the wires 2, 2, and terminating in upturned hooks, and a
5 horizontal stay-wire 7 twisted around every one of the wires 2, 4, at the said hooked lower ends; substantially as described.

In witness whereof we have hereunto set our hands in presence of two witnesses.

JOHN CHOYCE GARRATT.
THOMAS BROWN.

Witnesses:
HECTOR C. GRUNDY,
ERNEST WYER.